INVENTORS
Bruno O. Weinschel
Gunther U. Sorger

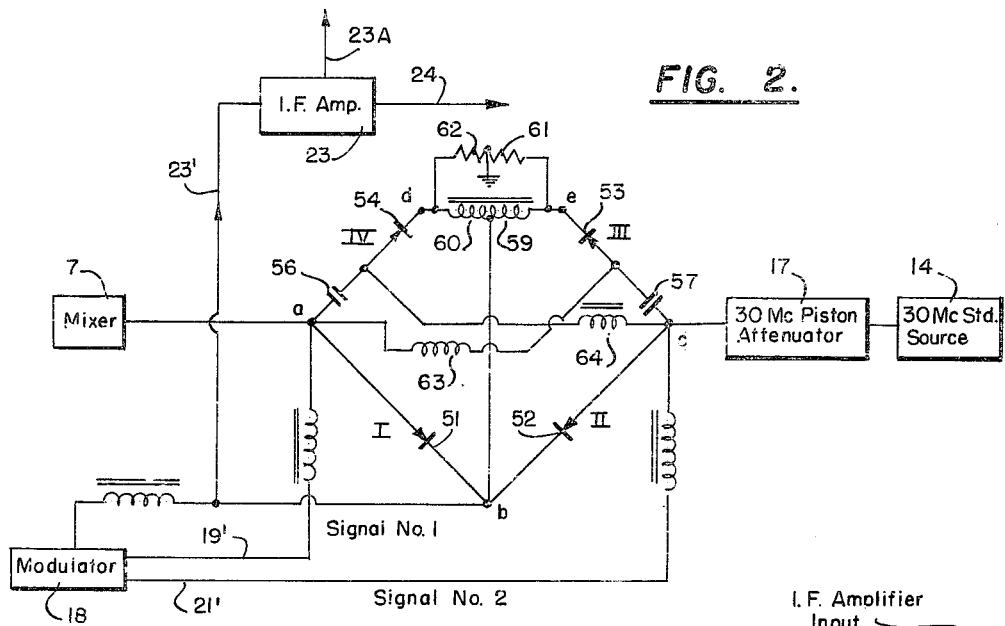
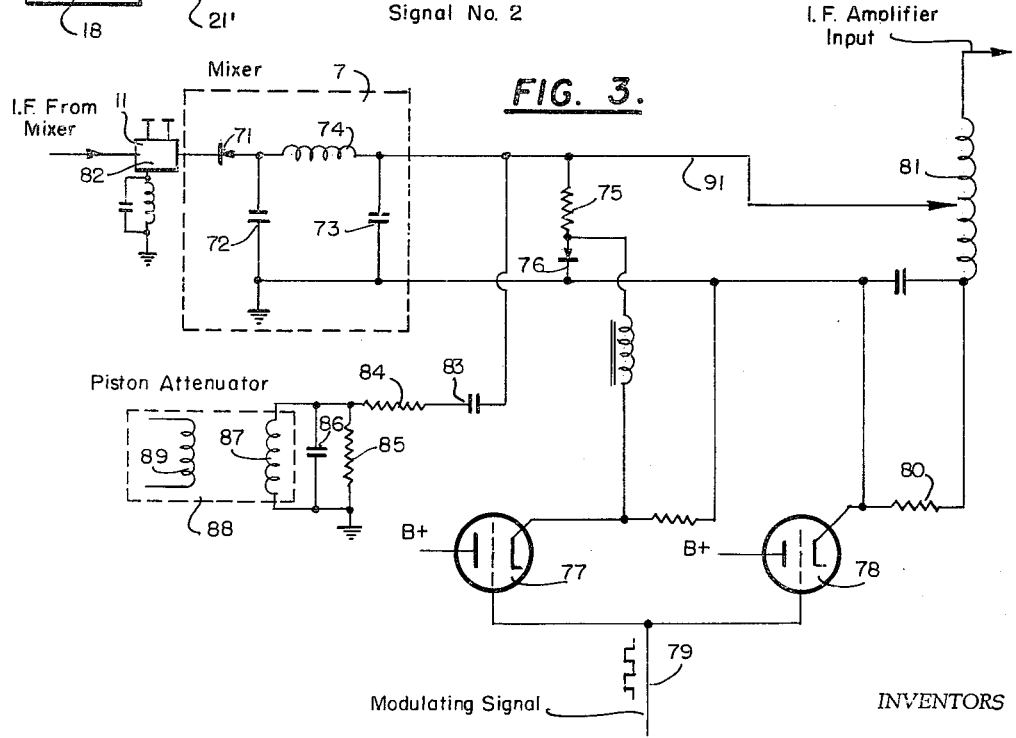
INVENTORS
Bruno O. Weinschel
Gunther U. Sorger
BY Max L. Libman
ATTORNEY United States Patent Office 3,098,968
Patented July 23, 1963

3,098,968
STANDARD SOURCE COMPARISON SYSTEM FOR HIGH-FREQUENCY VOLTAGE RATIO METER INCLUDING ALTERNATELY CONNECTABLE LOAD TERMINATIONS
Bruno O. Weinschel, Bethesda, and Gunther U. Sorger, Rockville, Md., assignors to Weinschel Engineering Co., Inc., Kensington, Md., a corporation of Delaware
Filed Aug. 17, 1961, Ser. No. 132,233
6 Claims. (Cl. 324—58)

This invention relates to high-frequency calibration systems and apparatus, and particularly to improvements in such a system as is described in the copending application Serial No. 64,766, now Patent No. 3,034,045, of Bruno O. Weinschel for Voltage Ratio Meter for High-Frequency Calibration Systems.

A system to which the invention pertains is also described in an article by Hedrich et al., "Calibration of Signal Generator Output Voltage in the Range of 100 to 1000 Megacycles," IRE Transactions on Instrumentation, December 1958, vol. 1–7, Nos. 3 and 4, pp. 274–279.

In either of the above measuring systems, an I.F. signal derived from the R.F. generator being tested, and another signal from a standard source at the same I.F. frequency, are fed in interlaced fashion to an I.F. amplifier where, in effect, the signal being tested is compared with the signal from the standard source. In the practical embodiment described above, either the signal generator or the local oscillator which was used to reduce the frequency of the signal generator to the 30 megacycle intermediate I.F. employed in these systems was required to be modulated 100% by a 1000 cycle squarewave in order to obtain an I.F. signal which is also 100% squarewave modulated. This is necessary to compare the standard signal and the I.F. signal. It is difficult to keep the frequency of the signal generator constant above 1000 megacycles if the amplitude is 100% modulated. The biggest disturbing effect appears to be caused by the incidental or unwanted f-m due to the modulation; this can cause severe frequency modulations which may be wide enough so they exceed the flat portion of the I.F. amplifier bandwidth-frequency response. The reasons for this frequency modulation is not entirely clear, it appears to involve a number of factors, including electronic interactions of the electron beam when it is turned on and off by grid control, and particularly in a klystron, where the effect is most severe, the oscillation does not start immediately, but there is a transient, because the electrons have to be disturbed sufficiently in the first instance to start oscillations, since this is a velocity-modulated effect. The time constant of this transient effect in the present circuit turns out to be quite long, perhaps in the neighborhood of 1/10 second, which compared to the 500 microsecond interval under consideration makes this a very serious defect. The present solution to this problem requires letting both the local oscillator and the signal generator run continuous-wave; in this case, in order to get the modulated I.F. signal, several different approaches may be considered. One way is to use an external modulator; it is difficult to obtain more than 95% modulation, and these R.F. modulations cover only a narrow R.F. frequency range, usually have an appreciable insertion loss and can introduce appreciable noise into the system. A much preferable way is to modulate the I.F. signal itself. This means modulating the signal after it is beaten down in frequency to 30 megacycles. This can be done in several ways which will be shown below.

It is a major object of the present invention to eliminate the above-described difficulty by, in effect, alternately switching the I.F. signal from the source being tested and the I.F. signal from standard source into the I.F. amplifier in interlaced fashion, so that at any given instant either one or the other is supplying the I.F. amplifier, while the one which at that instant is not supplying the amplifier is still being operated continuous-wave fashion into an inert load of the proper value so that its C-W output remains constant and is not disturbed by any transient effects.

Another object is to provide a specific direct mechanical switching arrangement for controlling this operation. Still another object is to provide an electronic switching arrangement for controlling the same operation, and a further object is to provide a novel biasing arrangement for controlling the same effect.

The specific nature of the invention as well as other objects and advantages thereof will clearly appear from a description of a preferred embodiment as shown in the accompanying drawings, in which:

FIG. 2 shows an electronic switching system using diodes, which may be substituted for the mechanical switching system of FIG. 1; and FIG. 3 shows an alternative biasing system for supplying the interlaced signals to the I.F. amplifier.

Figure 1:
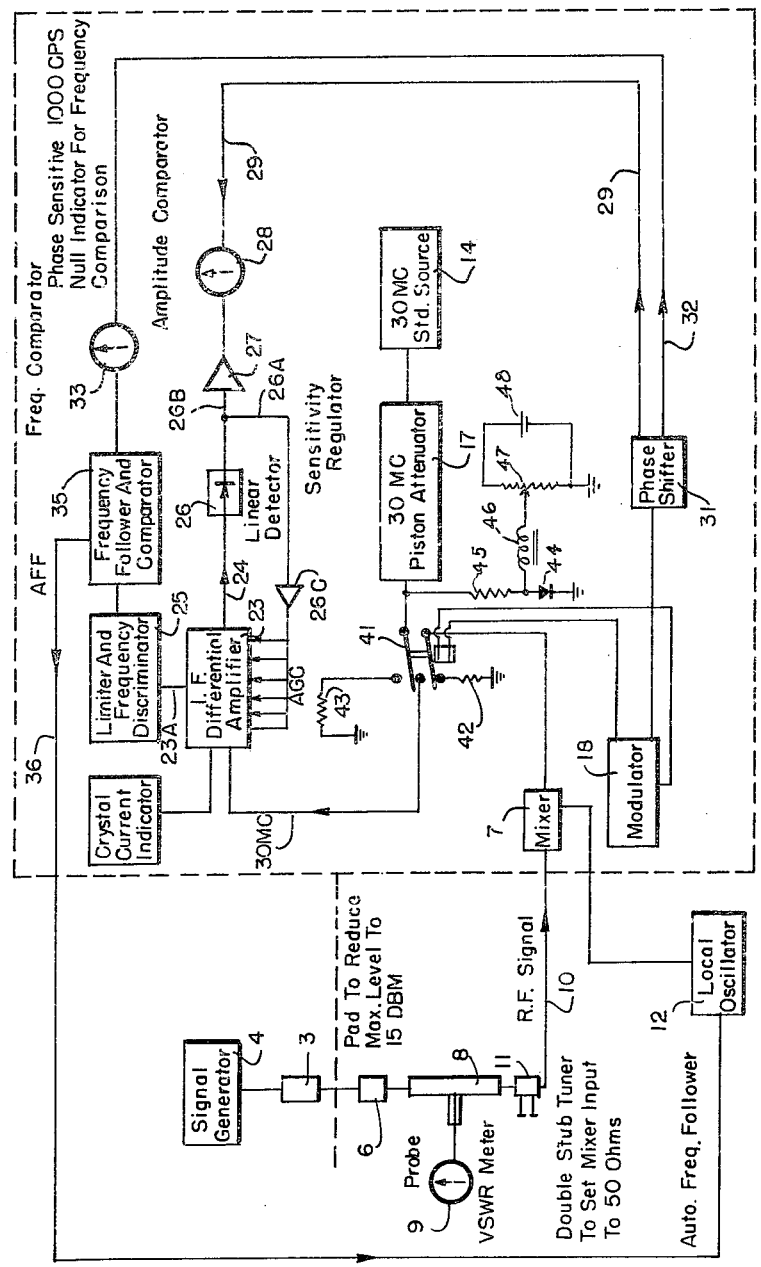
FIG. 1 is a circuit diagram of the entire measuring system, showing a mechanical switching system.

In FIG. 1 the switching is done by actual mechanical of solid-state switching, where the input to the I.F. amplifier is essentially switched from the mixer over to the standard signal. This means that both the I.F. and the standard signal will run C-W and will not be modulated, but the I.F. amplifier will at one time look only at the output from the standard source. That source consists of the piston attenuator 17 and the 30 megacycle source. The switch 41 is actuated from the modulator 18. If it is a mechanical switch, the frequency might be quite low, perhaps 100 cycles or even lower. If it is a solid-state switch or an electronic switch, the frequency is preferably 1000 cycles. The switch 41 in FIG. 1 is not a single-pole-double-throw switch, but it is a double-pole-double-throw switch. The reason for that is the necessity for the precaution that both the mixer output and the standard signal source output should look, when they are turned off, at an impedance 42 having a value which simulates the parallel arrangement of I.F. amplifier input impedance and 30 mc. piston attenuator output impedance, and at an impedance 43 which simulates the parallel arrangement of I.F. amplifier input impedance and mixer output impedance. This prevents the occurrence of transient effects when the switch is thrown over from the 30 mc. piston attenuator output to the mixer output, since under all conditions of switching, the impedance seen by the mixer and standard source remains constant. The mechanical switch may be a magnetic reed switch or similar type, or alternatively, a solid-state switch may be employed, as is well known in the art. A mechanical switch has the advantage that the noise of the system will not be increased by the switch itself. This means, for instance, if the switch is itself connected to the I.F. output and a low level I.F. signal is present, that the switch will not introduce any additional noise into the system, since the insertion loss when the switch is closed is very low, the impedance of the switch being so low that no additional noise appears. Preferably, the switches should be made so that the make-and-break occur simultaneously. Mechanical switches of this type, working to control 30 mc. at an audio-frequency rate, are available and can be used. The insertion loss of switch 41 when open is large enough so that there is essentially no cross-talk to the other channel. This means, referring to FIG. 1, that the signal leaking in from the I.F. channel is down by a factor of 1000:1, voltage-wise; or in other words, the capacitive coupling between the open switch and its contact for the I.F. amplifier input impedance as a load is so low that the insertion loss is at least 60 db. This solution involves not only the mechanical switch, but also a proper driver for the switch, and proper design impedance-wise, as is known in the art.

The above solution eliminates one source of error, but for higher accuracy of measurement, a further possible source of error should be provided for, namely, that due to unbalanced noise from the two inputs to the I.F. amplifier. A noise balance is necessary to extend the lower-end range of the system. As in any other receiver system, the low end of the receiver sensitivity is determined by the amount of noise which the system creates by itself. There are two major noise sources in the system: One is the mixer by itself; the other is the 30 mc. amplifier, and particularly the first two stages of this amplifier. The mixer consists of a microwave crystal which is biased by a local oscillator. Crystal theory shows that a crystal will act as a noise source with a noise figure which is linearly related to the average D.-C. current flowing through it. The mixer crystal consists usually of a crystal diode, for example, a 1N21 or a 1N23 crystal. Such crystals act as noise sources, and their noise figure increases substantially linearly with the average rectified D.-C. current through them. If the mixer crystal is disconnected from the I.F. amplifier, the noise at the output of the I.F. amplifier will change; since at one time we have the crystal as a noise source, and at another time we have only a plain resistor (resistor 42). The signal coming from the 30 mc. standard source is substantially noise-free, since the noise content of the output of the 30 mc. source is very small. Therefore, without the switching arrangement, with the signal source modulated, in the previous arrangement, the mixer crystal current stayed constant and the mixer was always connected to the input of the I.F. amplifier, whether the signal was coming from the R.F. source or from the 30 mc. source. With the present switching arrangement, if switch 41 is turned to the position shown in FIG. 1, where the 30 mc. standard signal is connected to the I.F. amplifier, the mixer is disconnected entirely and therefore the noise which the mixer previously contributed to the 30 mc. standard signal is no longer present.

In the earlier arrangement, where the local oscillator was run continuous-wave, and the R.F. source was modulated, the noise content in both halves of the switching period was the same, therefore the contribution of the noise to the average output of the second detector, detector No. 26 of FIG. 1, was the same. In other words, even in the presence of noise, one could detect a true amplitude balance, since the noise, in effect, cancelled out. However, if the mixer is no longer present during the half when the 30 mc. piston attenuator is connected, this noise contribution is missing. Therefore, if the signal plus noise at the input to amplifier 27 is the same for both halves, but the noise is different for both, the signal will also be different for both and we will no longer obtain a true signal amplitude balance. We only have a balance for signal plus noise in one case, and the signal alone in the other case. In order to eliminate this difficulty, crystal 44 in FIG. 1 is used to provide noise balance during both halves of the cycle. This is accomplished in the circuit of FIG. 1 by crystal 44 used as a noise source. Resistor 45 is used to decouple the noise source from the 30 mc. piston attenuator circuit. Since the crystal 44 has a forward impedance of less than 50 ohms, a biasing of this crystal in the forward direction will essentially short out the 30 mc. piston attenuator. To prevent this, resistor 45, of about 400 ohms is inserted as shown. This means that the noise voltage appearing across the input of the I.F. amplifier is approximately one-half of the noise voltage produced by crystal 44. The forward bias which is necessary to draw the D.-C. current through the crystal is provided by battery 48; this then will create the noise, remembering that the noise figure of the crystal is linearly related to the D.-C. current through the crystal. In order to make the forward current adjustable, so that the noise from the two inputs to the amplifier can be balanced out, a potentiometer 47 is placed across the battery to provide a variable tap-off voltage whereby the current through 44 can be controlled. Choke 46 decouples the high frequency circuit from the D.-C. circuit. Some means must be available to initially balance the two noise outputs. This can be done in the following way: The R.F. signal is disconnected from the mixer and only the local oscillator is connected to it. This will bias the mixer crystal and will create the noise which the mixer crystal contributes to the I.F. amplifier. The 30 mc. standard source is either entirely disconnected or adjusted so that its attenuation is very great, under which condition neither an R.F. signal nor a 30 mc. standard signal enters the I.F. amplifier. However, since switch 41 is still operative, the input to amplifier now includes the noise from the mixer and the noise from the crystal 44. This will present a rectified output voltage, rectified by linear detector 26, since there is a certain amount of noise in the 1 mc. bandwidth of the 30 mc. I.F. amplifier. This rectified signal now should be the same amplitude for both the noise coming from the mixer and the noise coming from crystal 44. This will be shown by the amplitude comparator as a null setting. If the noise contribution from both sources is not the same, the amplitude comparator will show a deflection. Therefore, potentiometer 47 under these conditions is now adjusted so that the amplitude comparator will show a null.

FIG. 2 shows an arrangement for the same switching operation as shown in FIG. 1, but using solid-state switches. Here the switching is done by means of diodes, which, by putting a forward voltage onto them and drawing current from them, act as an actual short; germanium diodes are available which have a forward resistance of perhaps 5 or 10 ohms, but if a backward voltage of the proper value is applied to them, possibly 2 or 3 volts, they will exhibit a backward resistance of about a megohm. Therefore, by properly selecting the I.F. amplifier input impedance, which in a practical apparatus may typically be 800 ohms, changes in the order of 60 db between the "open" and "closed" condition of the solid-state switch can be easily obtained. This again is a voltage ratio of 1000:1, as in the previous example. The crystal switch should be laid out in such a way that it simulates the mechanical switching circuit of FIG. 1. Such a circuit is shown in FIG. 2. If we feed a positive signal between points $a$ and $b$, and since signal 1 and signal 2 are in counter-phase, the signal between points $c$ and $b$ is negative. This means that point $a$ is positive with respect to point $b$ and there is a forward bias on diode 51 and a backward bias on diode 52. Diodes 53 and 54 are used to connect to the proper load to the particular circuit. Diode 54 connects the proper load termination 62 to the 30 megacycle output of the mixer when diode 51 is blocking, and diode 53 is used to connect the proper load 61 to the output of the standard signal when diode 52 is blocking. Diode 54, essentially between $c$ and $b$, is blocking when 51 is conducting, which is the proper condition, as now no load will appear across the mixer output. Diode 53 is for the modulating signal, essentially across points $a$ and $b$. If $a$ is positive with respect to $b$, diode 53 will be conducting. The inductance coils 59, 60, 63, and 64, shown in that circuit are necessary to decouple the 30 mc. signal from the modulation signal. They act as blocking elements for the 30 mc. frequency. They should be designed not to present any appreciable impedance to the modulating signal. Assume that we are putting a 1000 cycle squarewave signal in at point $a$ so that point $a$, at 1000 cycles, is positive with respect to point *b*. Since as indicated, signal 1 on line 19' and signal 2 on line 21' are in counter-phase, the signal between points *c* and *b* is negative. This means that diode 51 is conducting fully, while diode 52 is fully blocking. By the same reasoning, diode 53 is fully conducting, since it is essentially in parallel for the modulating signal with diode 51. For this condition, where there is a positive voltage between points *a* and *b* through diode 51, and also positive voltage between *a* and *b* through line 58, diode 53 and chokes 59 and 63, if the I.F. signal is conducted fully to the I.F. amplifier lead 23', and the standard signal from the standard source is blocked from I.F. amplifier lead 23'. However, a termination for the 30 megacycles from the standard source is provided through condenser 57 and diode 53, through load resistor 61 to ground. Diode 54, as can be seen, is similarly in parallel with diode 52 for 1000 cycles. Diode 54 is therefore fully blocking (essentially open), and the load 62 which is in series with diode 54 to ground is not acting at all. However, if the signal is now reversed (the second half of the squarewave) by having a positive signal between points *c* and *b*, and the negative signal from *a* to *b*, then diodes 52 and 54 are conducting fully and diodes 51 and 53 are fully blocked. This means that now the standard source is connected to the I.F. amplifier and the I.F. output from the mixer is fully blocked off; however, the output of the I.F. now does have a proper load termination.

The second possibility has the problem that there might be some noise introduced by the blocked diode 52. In the system of FIG. 2, there is a chance that noise might be introduced by the diodes, when either conducting or blocking. This might cut down on the width of range of the instrument, which wide range is one of the major features of advantage of the system; therefore, too much reduction due to this noise is not tolerable. To eliminate this difficulty, a somewhat different arrangement is now described, using neither a mechanical nor a solid-state switch. Instead biasing signals are employed. This involves the mixer itself, which consists of nothing but an R.F. mixing diode in series with the R.F. line. FIG. 3 shows the equivalent circuit of such a system. Instead of a solid-state switch, vacuum tube triodes are used, which only involves redesign of the I.F. amplifier input.

Referring to FIG. 3, the crystal 71 is the mixer crystal of the basic circuit shown in FIG. 1. It is bypassed for very high frequencies by the capacitor 72. This capacitor together with capacitor 73 and inductance 74 act as a low pass filter to pass only the 30 mc. signal. It will be seen that this is the equivalent circuit of the mixer. If we now by some means could bias the mixer in a reverse direction, then the insertion loss of the mixer would increase greatly, for example, to an insertion loss of about 30–40 db, which is sufficient for switching action. Definitely, the I.F. signal coming out of the mixer would be modulated nearly 100% if a biasing voltage were applied to the crystal in a 1000 cycle squarewave fashion which at some time would have no bias signal at all on the crystal and at another time would provide a negative bias signal. The crystal is normally biased positive by its local oscillator; this is indicated because a crystal current is drawn, but if we push the operating point of this mixer crystal far enough to the negative side, to the proper location, the mixing effect practically ceases and no I.F. signal comes out. This effect therefore could also be used to modulate the I.F. signal by a squarewave and this in turn means that the I.F. signal can thus be switched on and off. In order to have a load or a noise source equivalent to the crystal available, another crystal must be inserted into the system when the mixer crystal is turned off. This is the crystal 76, together with resistor 75, which is provided to adjust the noise effect of crystal 76 so that it is equivalent to 71. The grids at the two cathode followers 77 and 78 are supplied with the squarewave modulating signal on line 79. We can see on the two cathode follower arrangements 77, 78, that if the modulating voltage is positive with respect to ground then crystal 76 will be conducting. However, crystal 71 will be negatively biased, since the grid voltage is positive; the voltage across resistor 80 will also be positive, that is, the cathode of its associated tube will be more positive than the other side of crystal 71, and since the cathode of tube 78 is tied to ground, the other point will also be at a negative potential, and therefore the anode of crystal 71 will also be at a negative potential so that the crystal will be negatively biased. To get the D.-C. return for the crystal, a double-stub tuner 82 corresponding to 11 in FIG. 1 is connected to the input, which essentially puts a dead short on it for D.-C. or low frequencies. The input is therefore shown as a short, but actually, of course, it is not a short for R.F., only for low frequencies.

The 100% squarewave modulation of the standard signal is accomplished by modulating the 30 mc. standard source, as described in FIG. 1 of the previously referred to application. This is essentially the same as switching the standard signal on and off. Coil 89 in FIG. 3 is the sending coil and coil 87 is the receiving coil of the 30 mc. piston attenuator. Capacitor 86 is used to tune coil 87 to 30 mc. Resistor 85 is inserted to obtain the proper Q for the parallel resonance circuit. Resistor 84 is selected to present the proper impedance for the standard signal channel to the I.F. channel. Capacitor 83 is essentially an open circuit for low frequency (1000 cycles) and a short circuit for 30 mc. It blocks the low frequency modulation signal from entering the standard signal channel; however, it will pass the 30 mc. standard signal current from the piston attenuator.

The modulating signal 79 and the modulating signal which is used to modulate the 30 mc. standard source are phased in such a way that when the mixer crystal 71 is biased negatively which happens when the modulating signal 79 is positive with respect to ground, then the standard signal is on, and when the modulating signal 79 is negative with respect to ground, which means that there is no bias on the mixer crystal 71, during this time the standard signal is off. This now results in the switching action which we desire. A positive modulating signal 79 producing a negative bias on mixing crystal 71 will turn the I.F. signal essentially off by increasing the conversion loss by 30–40 db. During this time the standard signal will be on. When the standard signal is turned off, by modulating the 30 mc. source to the off position, the modulation signal 79 will now be negative, thus allowing the mixer crystal to be unbiased and thereby reducing the insertion loss to about 5–6 db and essentially passing the I.F. signal through fully. As in the previous application, the phasing of these two signals now can be adjusted so that they interlace properly; this will be done in the same manner as shown in FIG. 1 of the previous application.

It will be apparent that the systems shown above all provide means whereby the signal source and the local oscillator can run continuous wave while a modulated I.F. signal is being produced which is inter-compared at a rapid rate with the standard signal. In order to avoid any incidental frequency modulation which may be caused by modulating either the signal source or the local oscillator, means are provided to leave both the signal source and the local oscillator source on at all times, with a constant load, while the inter-comparison is being made. This is accomplished by switching the input of the I.F. amplifier from the I.F. signal to the standard signal so that during one-half of the switching cycle, the I.F. signal will be across the input to the I.F. amplifier and during the other half of the switching cycle, the standard signal will be across the input to the I.F. amplifier. During this operation provision is made for maintaining the load conditions on each of the two channels the same during the on and during the off condition, thus accomplishing the desired result.

We claim:

1. In an insertion loss test system comprising a high-frequency signal generator, a standard source of I.F.; a local oscillator; a mixer for beating the output of said generator with the output of the local oscillator to provide a beat frequency output at the same frequency as the standard I.F. source; an I.F. amplifier; and means for alternately supplying the output from said standard source and from said mixer in counterphase to said I.F. amplifier for comparison during continuous-wave operation of both the mixer and the standard source, comprising transfer means for alternately supplying each of said outputs to the I.F. amplifier in turn, and means for supplying the other of said outputs to a respective load termination for each device, during the alternate periods when the output of each device is not supplied to the I.F. amplifier, each said load termination being of the same value as the load seen by the device during the interval when its output is supplied to the I.F. amplifier, whereby the mixer and the standard source are respectively under constant load during the comparison.

2. The invention according to claim 1, said transfer means comprising a plurality of diode switching means of the type presenting a low impedance when electrically biased in one direction and a high impedance when biased in the opposite direction; modulator means supplying a bias voltage at a determined modulating frequency, certain of said diode means being connected between the mixer output and the I.F. amplifier input and other of said diode means being connected between said standard source output and the I.F. amplifier input, and circuit means supplying bias voltage at the modulating rate from said modulating means to alternately bias said certain diode means and said other diode means to thereby alternately supply the output of the mixer and of the standard source to the I.F. amplifier.

3. The invention according to claim 2, said diode means comprising a first diode path connected between the mixer output and the I.F. amplifier for passing the mixer output directly when properly biased by said intermittant bias voltages; a second diode path connected between the standard source output and the I.F. amplifier for passing the standard source output directly when biased in the intermediate intervals by said modulating means; a third diode path connected between the mixer and its load termination, and a fourth diode path connected between the standard source and its load termination, and means for biasing said third and fourth diode paths respectively to the current passing condition when the second and first paths are respectively biased to the current passing condition, whereby each output has a proper load termination when the other output is supplied to the I.F. amplifier.

4. The invention according to claim 1, said mixer including a first diode path which passes current under a first bias condition and obstructs current passage under a second bias condition; load means constituting the load termination for said mixer; a second diode path including diode means in circuit with said load means for effectively connecting and disconnecting said load means and said mixer under first and second bias conditions respectively; said transfer means including means for biasing said first diode path to said first bias condition and said second diode path to said second bias condition simultaneously, during the periods when the standard source is not supplied to the I.F. amplifier, and for biasing said first diode path to the second bias condition and said second diode path to the first bias condition during the periods when the standard source is being supplied to the I.F. amplifier.

5. The invention according to claim 1, said mixer normally providing a noise input to the I.F. amplifier as part of its normal output, and further noise means to provide a similar noise signal during the period when the standard source is supplied to the I.F. amplifier, including means to adjust said similar noise to substantially the same level as the noise input from the mixer.

6. The invention according to claim 5, said further noise means comprising crystal means, and means for supplying a variable voltage to said crystal means to control its noise output.

References Cited in the file of this patent

UNITED STATES PATENTS

| | | |
|---|---|---|
| 2,282,068 | Liebad et al. | May 5, 1942 |
| 2,419,527 | Bartelink | Apr. 29, 1947 |
| 2,499,755 | Hunt | Mar. 7, 1950 |
| 2,964,623 | Bell | Dec. 13, 1960 |

FOREIGN PATENTS

| | | |
|---|---|---|
| 1,029,472 | Germany | May 8, 1958 |
| 1,112,143 | Germany | Aug. 3, 1961 |

OTHER REFERENCES

Radio IF Tester, article in Radio Electronics, February 1956, page 51.